(12) United States Patent
Voights

(10) Patent No.: US 6,208,484 B1
(45) Date of Patent: Mar. 27, 2001

(54) RECIRCULATION FILTER FOR USE IN A DISK DRIVE

(75) Inventor: Ronald L. Voights, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/330,435

(22) Filed: Jun. 11, 1999

(51) Int. Cl.$^7$ .................................................... G11B 17/02
(52) U.S. Cl. ............................................................ 360/97.02
(58) Field of Search ............................ 360/97.02, 97.03, 360/97.04

(56) References Cited

U.S. PATENT DOCUMENTS

| | | |
|---|---|---|
| 4,329,722 | 5/1982 | West ........................................ 360/98 |
| 4,633,349 | 12/1986 | Beck et al. .............................. 360/97 |
| 4,885,652 * | 12/1989 | Leonard et al. ....................... 360/133 |
| 5,025,337 | 6/1991 | Brooks ............................... 360/97.03 |
| 5,307,222 | 4/1994 | Dion ................................... 360/97.02 |
| 5,406,431 | 4/1995 | Beecroft ............................ 360/97.02 |
| 5,455,728 * | 10/1995 | Edwards et al. ...................... 360/105 |
| 5,602,700 * | 2/1997 | Viskochil et al. .................... 360/105 |
| 5,869,009 | 2/1999 | Bellefeuille et al. ................. 422/171 |

* cited by examiner

Primary Examiner—Robert S. Tupper
(74) Attorney, Agent, or Firm—David M. Sigmond

(57) ABSTRACT

A recirculation filter is optimally placed within a disk drive to achieve enhanced filtration performance. The recirculation filter is located in a corner of the disk drive proximate to the pivot point of the actuator arm assembly. In a preferred embodiment, air flowing through the recirculation filter then travels through the voice coil motor, providing a source of clean air for cooling the VCM during disk drive operation.

23 Claims, 9 Drawing Sheets

RECIRCULATION FILTER FOR USE IN A DISK DRIVE

FIELD OF THE INVENTION

The invention relates generally to disk based data storage systems and, more particularly, to filter structures for use therein.

BACKGROUND OF THE INVENTION

A disk drive is a data storage device that stores data in concentric tracks on a disk shaped medium. Data is read from the medium by spinning the medium about a central axis while positioning a transducer near a desired track of the medium to sense the data. The transducer provides an electrical signal representative of the sensed data to data processing circuitry within the disk drive which converts the electrical signal to a format that is recognizable by an attached host unit. The converted data signal is then delivered to the host unit for use thereby. Disk drives can store data in any of a number of different forms, such as magnetic data storage and optical data storage.

Disk drive units are normally enclosed within a housing to protect the workings of the drive from the exterior environment. As can be appreciated, any undesirable substances that exist within the disk drive housing can have a deleterious effect on the operation thereof. For example, in a magnetic disk drive, particles and volatile gases within the drive housing can result in performance problems such as stiction between the magnetic transducer and the disk, transducer crashes, and thermal asperities. To reduce such occurrences, the level of airborne particles and gases within the disk drive should be kept low.

Therefore, there is a need for a filtering structure to reduce the levels of undesired substances within the housing of a disk drive.

SUMMARY OF THE INVENTION

The present invention relates to a recirculation filtering system for use in a disk drive for filtering undesired substances from the air circulating within the disk drive. The system includes a recirculation filter that is optimally located within the disk drive housing in an area beside the disk stack and proximate to the disk drive actuator arm. In addition, the system includes a baseplate shroud that surrounds the disk stack over a large portion of its circumference for reducing the generation of turbulence within the disk drive housing. The system also includes means for channeling air currents from the disk region into the recirculation filter for increasing the filtration efficiency within the drive. The recirculation filter is secured within a frame structure that is inserted into the disk drive housing during manufacture. A portion of the frame is preferably inserted into a recessed pocket within a floor of the disk drive baseplate to hold the frame in place within the drive.

DETAILED DESCRIPTION OF THE PREFERRED EMBODIMENTS

The present invention relates to a recirculation filtering system for use in a disk drive for filtering undesired substances from the air circulating within the disk drive. The system includes a recirculation filter that is optimally located within the disk drive housing in an area beside the disk stack and proximate to the disk drive actuator arm. The recirculation filter is secured within a frame structure that is inserted into the disk drive housing during manufacture. A portion of the frame is preferably inserted into a recessed pocket within a floor of the disk drive baseplate to hold the frame in place within the drive. Tab portions may also be provided for insertion into one or more recesses in a baseplate wall for additional support. The filtering system of the present invention is capable of significantly increasing filtration performance in disk drives using relatively simple and inexpensive filter structures.

Locating the recirculation filter proximate to the actuator arm provides many advantages over disk drive filtration systems of the past. For example, this location permits a filter having a significantly larger surface area to be used than the locations traditionally used to implement such filters. Also, this location generally experiences higher air flow velocities than filter locations of the past. In addition, the location of the recirculation filter near the actuator assembly allows filtered air emerging from an output of the filter to be used as a source of cooling for the voice coil motor of the disk drive. Further, the location allows the shroud around the disk stack of the drive to be extended around the disk perimeter, thus reducing air turbulence within the drive. This reduction in air turbulence results in reduced disk flutter and, consequently, better read/write performance.

Figure 1:
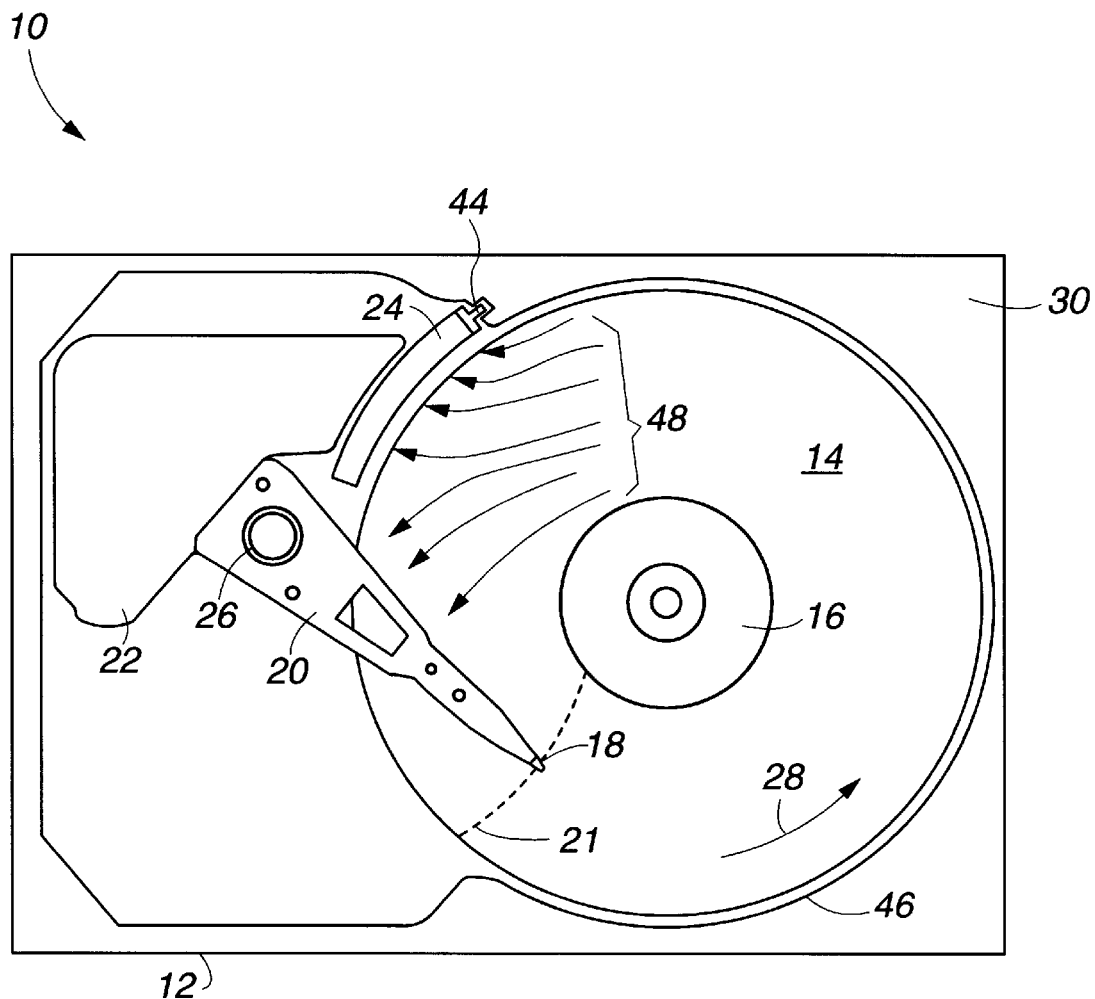
FIG. 1 is a top view of a disk drive, with its cover plate removed, in accordance with one embodiment of the present invention.

FIG. 1 is a top view of a magnetic disk drive 10 in accordance with one embodiment of the present invention. Although the invention will be described with respect to a magnetic hard disk drive, it should be appreciated that the invention can be used in virtually any form of data storage device using a rotating disk shaped medium. The disk drive 10 includes: a baseplate 12, a data storage disk 14, a hub 16, a spin motor (not shown), a transducer 18, an actuator arm 20, a voice coil motor (VCM) 22, and a recirculation filter 24. Although not shown, the disk drive 10 also includes control functionality for controlling the operation of the disk drive 10 and data processing functionality for performing, for example, data conversions required to effectively store and retrieve information to/from the disk 14.

The data storage disk 14 includes a plurality of concentric data storage tracks on an upper surface thereof that each store digital data in the form of magnetic polarity transitions. The hub 16 holds the disk 14 in a fixed position with respect to a central axis of rotation. Normally, the hub 16 carries multiple disks 14 stacked one above the other and secured to the hub 16 so that all of the disks share a common axis of rotation. The spin motor (not shown) is located below the disk 14 (and the other disks, if any) and is coupled to the hub 16 for imparting rotational motion to the hub 16 and the disk 14.

The transducer 18 is operative for reading and/or writing data from/to the disk 14 as it spins about its axis. In general, at least one transducer 18 is provided for each active disk surface within the disk drive 10. Each disk in a disk drive normally stores data on both a top and a bottom surface thereof and, therefore, at least two transducers are usually needed for each disk. The actuator arm 20 and the VCM 22 are used to controllably position the transducer 18 over a target track of the disk 14 so that a data transfer (i.e., a read or write operation) with the track can take place. The actuator arm 20 pivots about a pivot point 26 under the control of the VCM 22 to move the transducer 18 in an arc 21 across the face of the disk 14. The control circuitry (not shown) within the disk drive 10 uses a closed servo loop to generate control signals for delivery to the VCM 22 to control the positioning of the transducer 18 above the target track during read/write operations. The control loop uses servo data read from the surface of the disk 14 as position feedback to properly locate the transducer 18.

During normal operation, the disk drive 10 receives requests from an external host computer (not shown) to store or retrieve data to/from a particular track (i.e., the target track) of the disk 14. In response to each request, the control circuitry within the disk drive 10 begins a seek routine during which the transducer 18 is moved in a direction toward the target track. As the transducer 18 draws near to the target track, the control unit slows down the transducer 18 and eventually shifts to a track following mode during which the transducer 18 is locked onto the target track and follows the target track until the desired data transfer has been performed. After the requested data transfer is complete, the disk drive 10 is ready to perform another request.

As the disk 14 spins about its axis, air currents are generated within the disk drive housing. In general, these air currents follow the direction of disk rotation 28. Any loose particles within the disk drive 10 are generally caught up in these circulating air currents and likewise circulate around within the disk drive cavity. If these particles are not removed, they can damage and significantly reduce the performance of the disk drive 10. For example, particles can become lodged on the surface of the disk 14 causing thermal asperities which can seriously degrade disk drive read back performance. Similarly, particles can adhere to an underside of the transducer 18 which can result in, among other things, a non-optimal transducer flying height.

The recirculation filter 24 is operative for reducing the number of airborne particles within the disk drive housing. Disk drives of the past have traditionally placed the recirculation filter in a corner 30 (see FIG. 1) opposite the corner of the transducer/disk interface. In conceiving of the present invention, it was determined that enhanced filter performance, as well as other benefits, could be achieved by locating the recirculation filter 24 in the corner of the drive immediately preceding (with respect to the direction 28 of disk rotation) the location of the actuator arm 20, as illustrated in FIG. 1. For example, it was discovered that air current velocities are generally higher in this region than in the other corners of the disk drive housing. In addition, this location permits a filter having a larger surface area to be used. Furthermore, this filter location allows structures to be used within the disk drive that significantly reduce air turbulence within the drive, thereby reducing disk flutter and the associated performance reductions. Preliminary testing of the filtration system of the present invention has demonstrated increases in filtration efficiency as high as 300 percent over previous filter designs.

Figure 2:
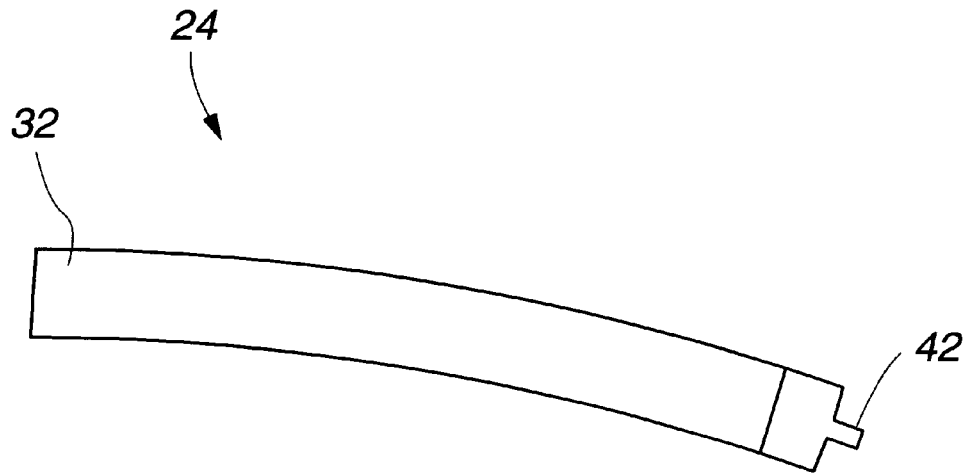
FIGS. 2 and 3 are a top view and side view, respectively, of a recirculation filter in accordance with one embodiment of the present invention.
Figure 3:
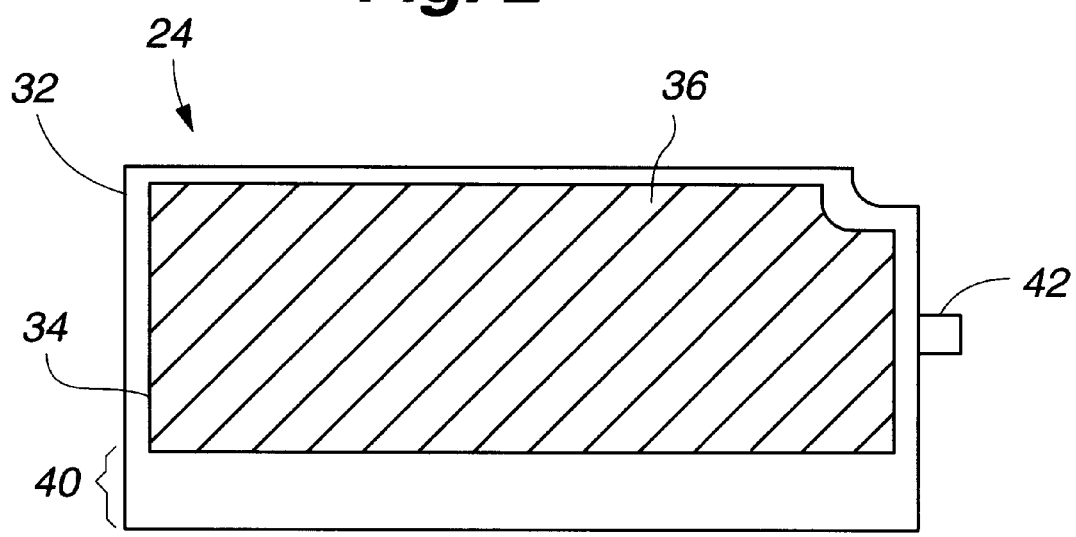

FIGS. 2 and 3 illustrate one embodiment of the recirculation filter 24 of FIG. 1. As shown, the filter 24 includes a frame 32 having an opening 34 into which a filter medium 36 is secured. The frame 32 is constructed of a relatively stiff, self-supporting material, such as a hard plastic material. The filter medium 36 is made out of a permeable material through which air can pass, but which is capable of capturing particles being carried by the air. The filter medium 36 can be woven or non-woven and include materials such as carbon and/or silica gel. In addition, the fibers of the filter medium 36 can be statically charged to enhance the filtration of particles. The filter medium 36 can be held within the frame 32 in any of a number of ways, including the use of adhesives, mechanical coupling, or bonding techniques such as heat or ultrasonic fusion.

In a preferred embodiment, the frame 32 includes a base portion 40 having a shape that conforms to the shape of a recessed pocket in the baseplate 30 of the disk drive 10. During disk drive assembly, the frame 32 is inserted into the pocket in the baseplate 12 which helps to properly locate the filter 24 within the disk drive housing and also provides structural support to the filter 24 during disk drive operation. An adhesive or sealant can be used to secure the frame 32 within the pocket of the baseplate 12 or, preferably, a compression fit is used to hold the filter 24 in place. The frame 32 also includes a tab 42 which fits into a slot 44 (see FIG. 1) in a wall of the baseplate 12 to provide vertical support to the filter 24 during disk drive operation, and the retention needed to hold the filter in place during assembly. The retention force is developed by the slight interference between the drive wall and the tab 42. The top of the filter 24 is held in place by the disk drive cover plate (not shown) which mounts flush over the top edge of the frame 32.

As illustrated in FIG. 1, another advantage realized by placing the recirculation filter 24 in the corner preceding the actuator arm 20 is that the baseplate shroud 46 (i.e., the wall standing next to and following the outer contour of the disk stack) can remain uninterrupted over a larger percentage of the disk perimeter than could previously be achieved. The shroud 46, by closely following the disk perimeter in a continuous fashion without discontinuities, promotes laminar air flow within the drive housing. As described above, filtration systems of the past generally locate the recirculation filter in a corner opposite the transducer/disk interface, thus introducing discontinuities into the shroud structure that upset laminar air flow within the drive and create undesired turbulence at intermediate points along the disk perimeter that contribute to increased disk flutter. By locating the recirculation filter in accordance with the present invention, the shroud 46 can be extended to cover a much larger portion of the disk perimeter in an uninterrupted fashion, thus reducing air turbulence within the drive 10 and enhancing read/write performance.

As shown in FIG. 1, the shroud 46 forms a continuous, uniform wall about the disk 14 from the transducer location all the way to the recirculation filter 24. Air currents in this region, therefore, are substantially laminar, with relatively little turbulence creation. As the air currents 48 approach the recirculation filter 24, they are drawn outwards by the reduced pressure created by the increased air stream volume behind the filter 24. Thus, a substantial portion of the air flow within the disk area is drawn outward through the filter 24. After the air has passed through the filter 24, it continues to flow through and around the VCM 22 and eventually back into the disk area. As is well known in the art, VCMs are normally open structures having many gaps and passages through which air can flow. Thus, the VCM 22 presents little resistance to air flow emerging from the rear of the recirculation filter 24. In addition, the filtering arrangement of the present invention provides a source of clean air for cooling the VCM 22 during disk drive operation. Because the recirculation filter 24 is located further "downstream" in the air flow path that past filter designs, the likelihood that particles generated at the transducer/disk interface (e.g., wear particles) will be captured immediately after generation is increased.

Figure 4:
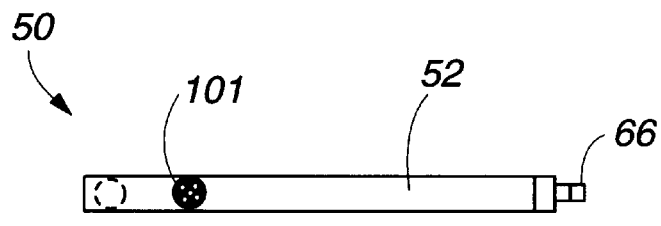
FIGS. 4 and 5 are a top view and side view, respectively, of a recirculation filter in accordance with another embodiment of the present invention.
Figure 5:
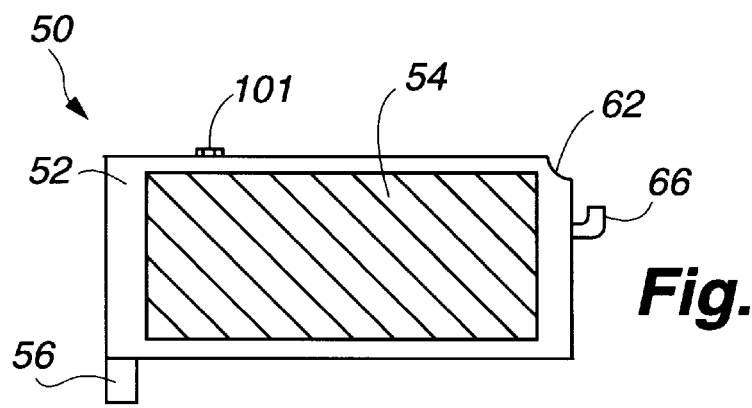
Figure 6:
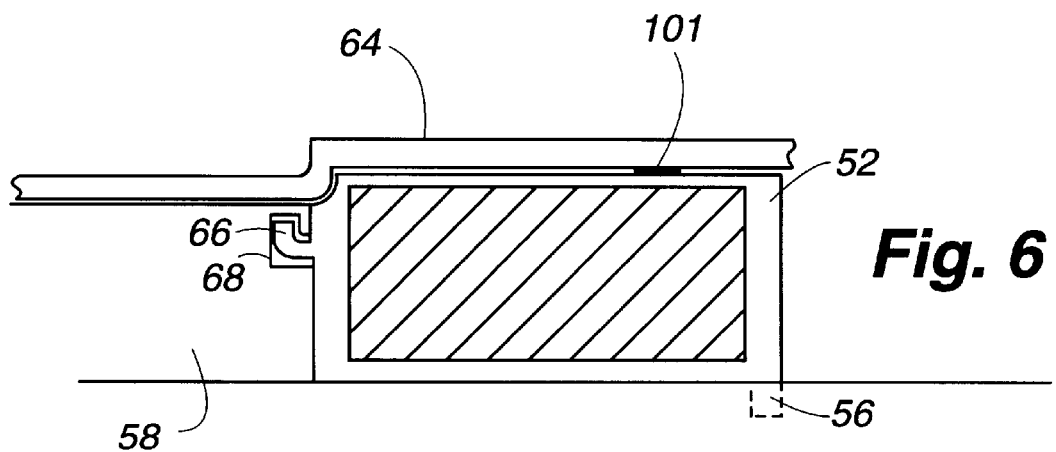
FIGS. 6 and 7 are drawings illustrating the placement of the recirculation filter of FIGS. 4 and 5 within a disk drive in one embodiment of the present invention.
Figure 7:
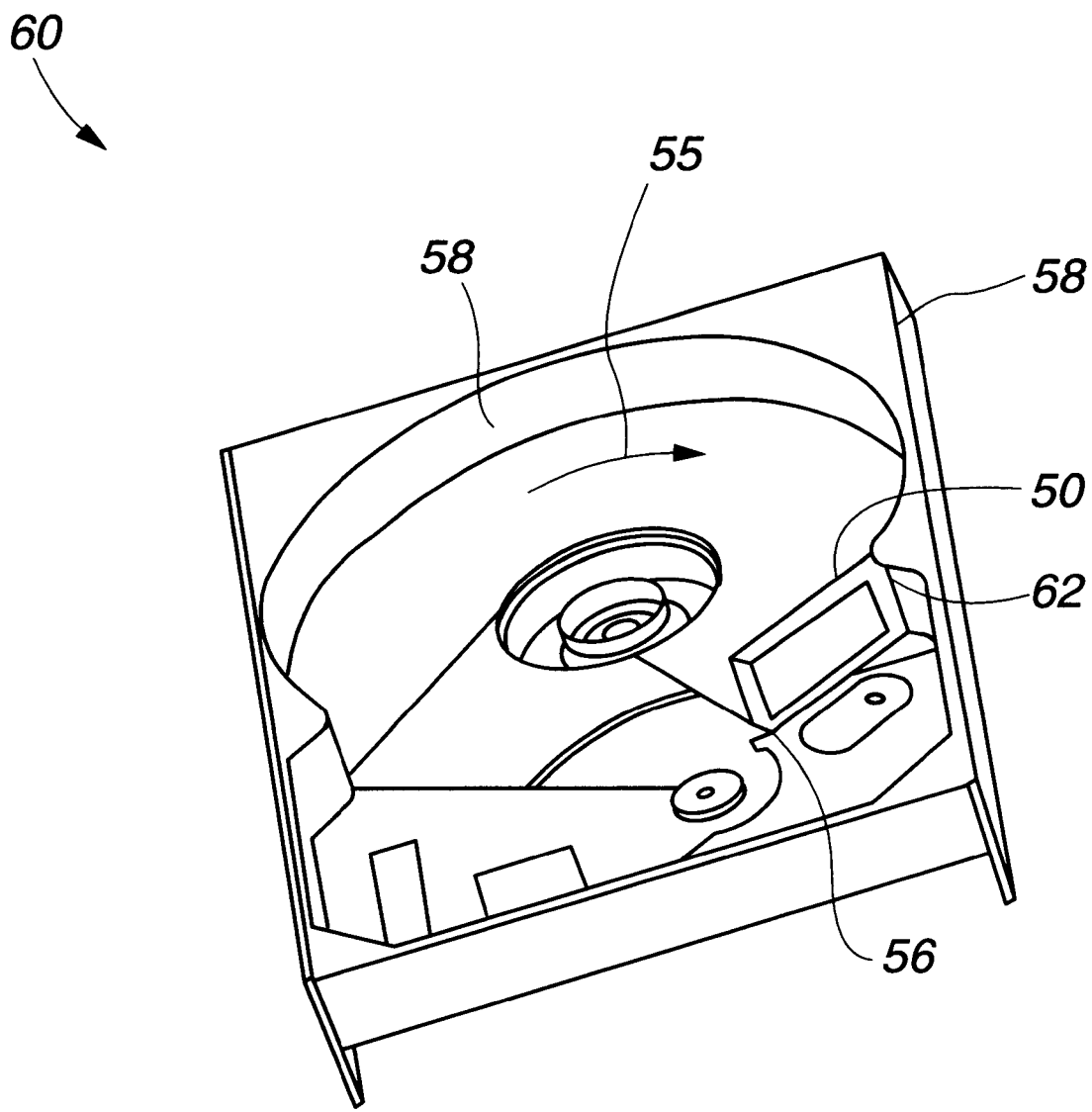

FIGS. 4 and 5 are a top view and side view, respectively, of a filter 50 in accordance with another embodiment of the present invention. FIGS. 6 and 7 illustrate the filter 50 inserted within a disk drive 60. Note that the direction of disk rotation 55 in the disk drive 60 of FIG. 7 is opposite to that of the disk drive 10 of FIG. 1. As shown in FIGS. 4 and 5, the filter 50 includes a frame 52 having a recirculation filter medium 54 disposed therein. The frame 52 includes a circular post 56 extending downward from a lower edge which fits within a circular pocket in the floor of the baseplate 58. The frame 52 also includes a notch 62 in an upper corner thereof. As shown in FIG. 7, the notch 62 provides clearance for the disk cover plate 64, permitting the filter top to be in close proximity to the cover plate 64. A viscoelastic damper 101 is attached to an upper edge of the frame 52 of the filter 50 to reduce mechanical resonances that may arise between the frame 52 and the cover plate 64.

During disk drive assembly, the post 56 is inserted into the circular pocket in the baseplate 58 and the filter tab 66 is inserted into the slot 68 in the wall of the baseplate 58. When the filter 50 is properly inserted, as illustrated in FIG. 6, the filter frame 52 is flush with the side wall of the baseplate 58. The tab 66 and the post 56 securely locate and retain the filter frame 52 during assembly. Once the cover plate 64 has been installed, the position of the filter 50 is fixed without the use of adhesive.

Figure 8:
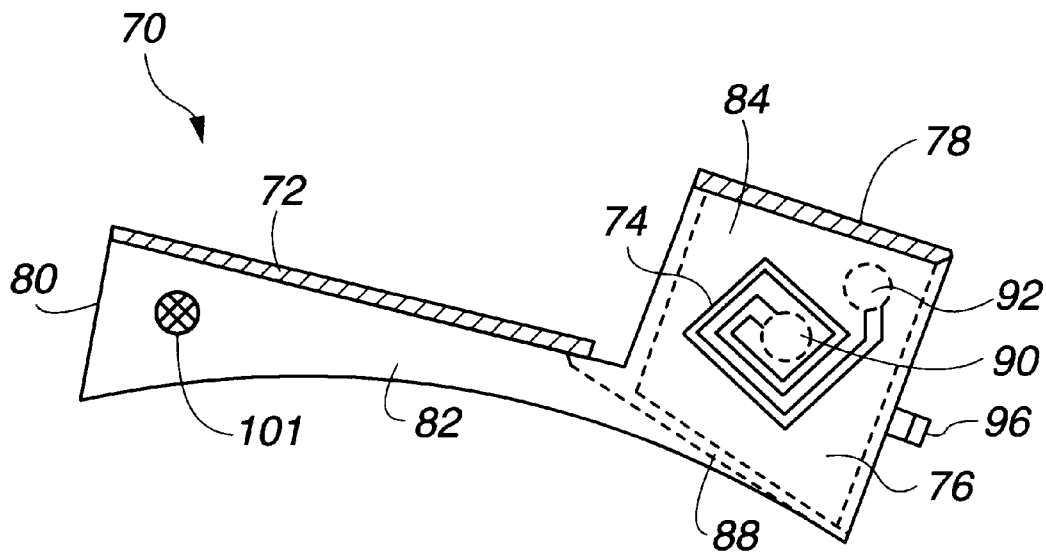
FIGS. 8 and 9 are a top view and side view, respectively, of an integrated filter in accordance with one embodiment of the present invention.
Figure 9:
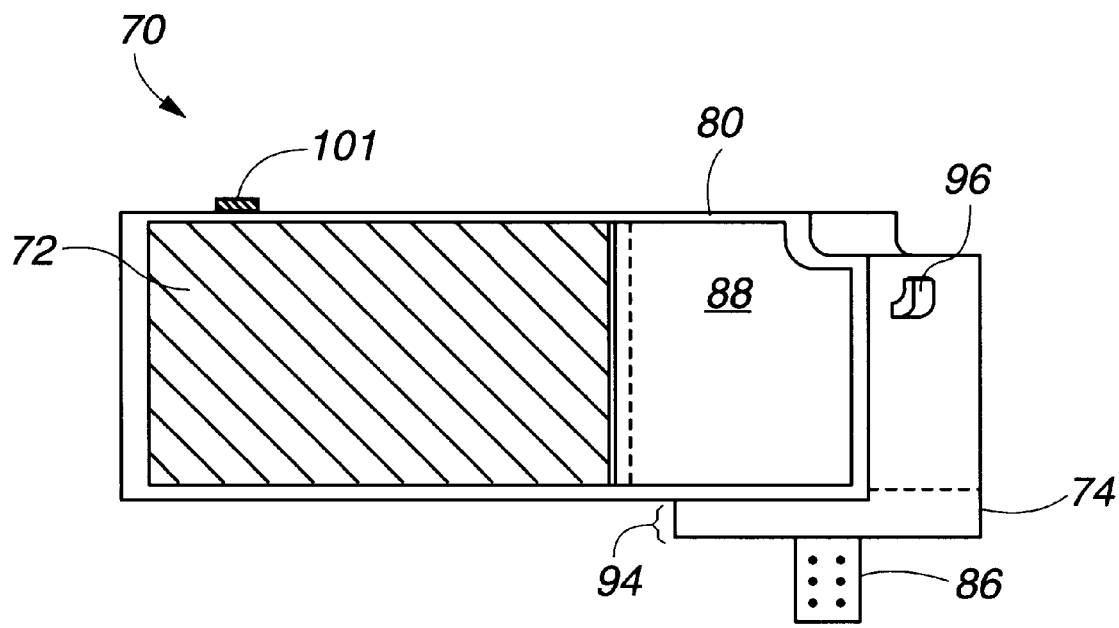

FIGS. 8 and 9 illustrate an integrated filter 70 in accordance with another embodiment of the present invention. As shown in FIG. 8, the integrated filter 70 includes a recirculation filter 72, a diffusion channel 74, a chemical filter 76, and a breather filter 78. Thus, the integrated filter 70 is capable of performing multiple filtration functions from a single filter cartridge. While the recirculation filter 72 is primarily concerned with filtering air circulating within the disk drive 100, the diffusion channel 74, the chemical filter 76, and the breather filter 78 are used to process air entering the disk drive 100 from an exterior environment. The diffusion channel 74 is operative for condensing potentially harmful vapors within incoming air before they reach an internal chamber of the disk drive 100. The chemical filter 76 is operative for removing potentially harmful gases and vapors from the incoming air. The breather filter 78 is operative for removing solid particles within the incoming air that might cause damage within the drive 100.

Figure 10:
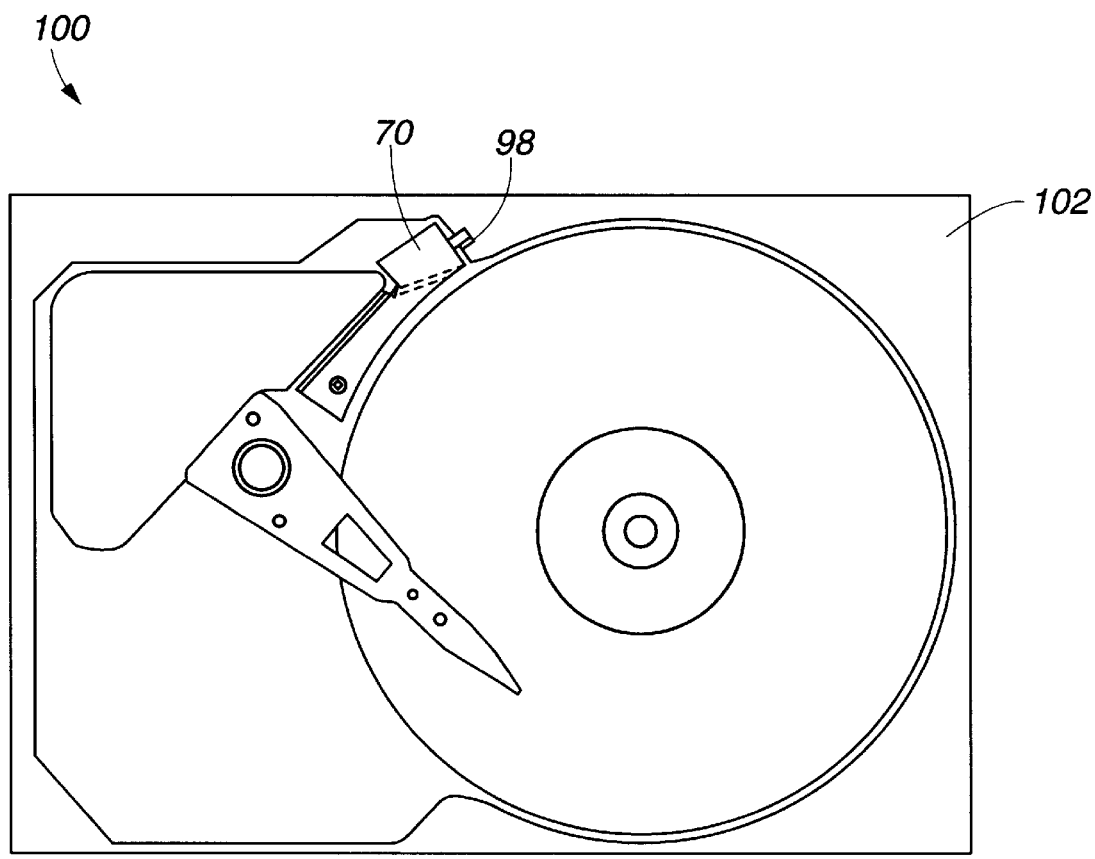
FIG. 10 is a top view of a disk drive, with its cover plate removed, illustrating the placement of the integrated filter of FIGS. 8 and 9 within a disk drive in one embodiment of the present invention.

The filters 72, 76, and 78 are housed within a frame 80 having a first cavity 82 and a second cavity 84. The first cavity 82 has the recirculation filter 72 disposed across an opening thereof. As such, the recirculation filter 72 portion of the integrated filter 70 operates similar to the previously discussed filter embodiments. The second cavity 84 is separated from the first cavity 82 by a wall 88 and holds the diffusion channel 74, the chemical filter 76, and the breather 78. FIG. 10 illustrates the integrated filter 70 inserted within the housing of a disk drive 100.

In a preferred embodiment, the diffusion channel 74 comprises a hollow tube structure that is housed within a substantially flat plate having two ports 90, 92. The diffusion channel 74 can be formed into the frame 80 itself or a separate plate structure can be provided. The diffusion channel 74 is preferably located on the lower side of the second cavity 84 and is covered with a diffusion cover plate (not shown) that provides an upper boundary for the channel 74. With reference to FIGS. 8 and 9, the first port 90 of the diffusion channel 74 couples downward through a tube 86 which emerges from the bottom of the frame 80. During disk drive assembly, this tube 86 is inserted within a breather port (not shown) in the floor of the baseplate 102 that is in fluid communication with an environment external to the disk drive 100. Air flow entering the first port 90 through the tube 86 travels through the diffusion channel 74 and emerges from the second port 92 into an upper portion of the second cavity 84.

The chemical filter 76 is disposed within the upper portion of the second cavity 84. Thus, the air exiting the second port 92 of the diffusion channel 74 next flows through the chemical filter 76. The breather filter 78 is disposed across an opening of the second cavity 84. Consequently, after the incoming air is processed by the chemical filter 76, it flows through the breather filter 78 and into the internal cavity of the disk drive 100.

During disk drive operation, situations may arise when pressure differentials exist between the region inside the disk drive 100 and the exterior environment. If the pressure outside the drive 100 is greater than the pressure inside the drive 100, a net flow of air into the drive results. The air enters the drive 100 through the tube 86 and subsequently flows through the diffusion channel 74, where condensates are removed. The air then flows through the chemical filter 76 where harmful gases and vapors are removed from the air. The air finally travels through the breather filter 78 which removes any dust or other solid particles from the air before it reaches the internal chamber of the disk drive 100.

With reference to FIG. 9, the frame 80 of the integrated filter 70 includes a base portion 94 which is shaped for insertion into a pocket in the baseplate 102 during disk drive assembly. The pocket in the baseplate 102 includes the breather port discussed above. The frame 80 also includes a tab 96 which fits within a slot 98 in a wall of the baseplate 102 for providing additional support to the filter 70. During disk drive assembly, the disk drive cover plate (not shown) contacts the upper surface of the filter 70 to hold the filter 70 in place during drive operation. A viscoelastic damper 101 can be attached to the top of the frame 80 to attenuate acoustic cover noise, in addition to locking the filter 70 in place.

Figure 11:
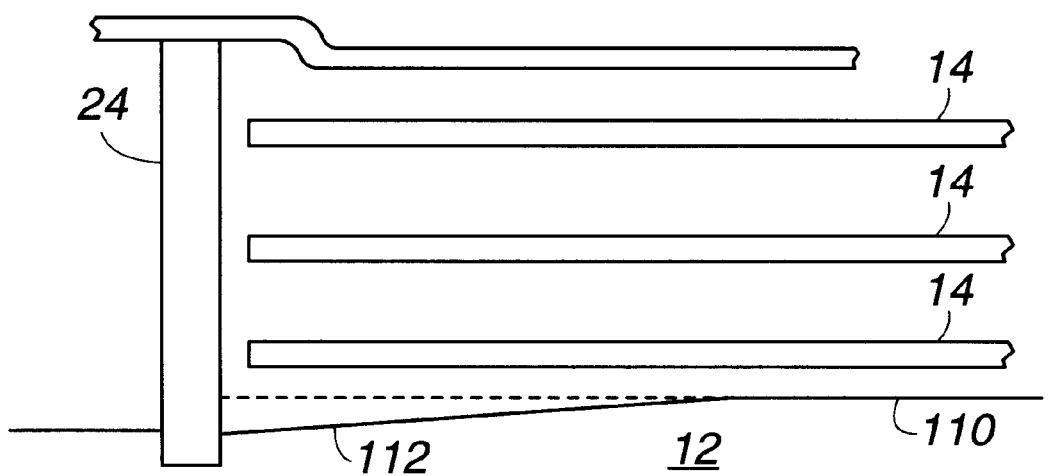
FIG. 11 is a sectional side view of an area surrounding a recirculation filter showing a recessed portion in a baseplate for channeling air into the recirculation filter.

As is generally known in the disk drive industry, the region between the lower surface of the lowermost disk in the disk stack and the floor of the baseplate is generally disproportionately populated with particles and debris. Part of the reason for this is the apparent inadequacy of past filtration systems in continuously exchanging the air in this region. In one embodiment of the present invention, a recessed region is provided within the baseplate floor near the location of the recirculation filter 24 to help rid the area between the lowest disk and the baseplate floor of particulate matter. As shown in FIG. 11, the floor 110 of the baseplate 12 is normally parallel to the plane of the disks 14. In accordance with the invention, a recessed portion 112 is provided in the baseplate floor 110 in the vicinity of the recirculation filter 24 for creating a low pressure region in the area by increasing the air volume experienced by the circulating air. This low pressure region draws the circulating air downwards and outwards from the region between the lowest disk and the floor 110. A large percentage of the air then flows through the recirculation filter 24 toward an even lower pressure region behind the filter 24. Thus, the air is "channeled" from the area below the lowest disk into the recirculation filter 24.

Figure 12:
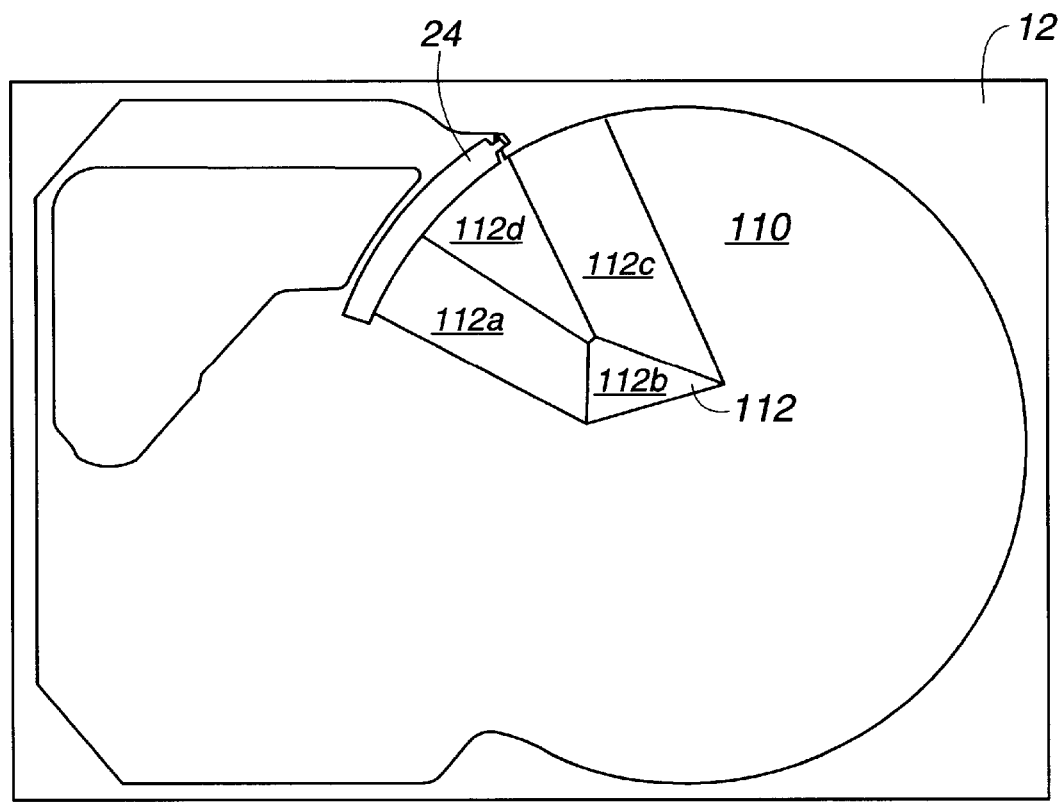
FIG. 12 is a top view of a disk drive baseplate illustrating the location of the recessed portion of FIG. 11 in one embodiment of the present invention.

FIG. 12 is a top view of a recessed portion 112 in one embodiment of the present invention. As shown, the recessed portion 112 includes a plurality of ramp portions 112*a*, 112*b*, 112*c*, 112*d* that are designed to channel the air outwards toward the recirculation filter 24 as described above. The slopes of the ramp portions 112*a*, 112*b*, 112*c*, 112*d* are preferably gradual to avoid the existence of sharp discontinuities that can create turbulence. As can be appreciated, any of a large variety of recessed baseplate structures can be utilized in accordance with the present invention to direct the circulating air into the recirculation filter. For example, structures that provide an initial decline to circulating air and then a subsequent incline into the recirculation filter 24 can also be used. Such structures would allow the input edge of the recirculation filter 24 to be at an elevation equal or similar to the elevation of the baseplate floor 110.

Like the area below the lowermost disk, the region between the uppermost disk and the cover plate also generally suffers from poor filtration. In accordance with another feature of the present invention, a dam structure is used on the lower surface of the cover plate to create a high pressure ridge that channels air outwards toward the recirculation filter 54. The dam structure comprises a lowered surface portion of the cover plate that forms a reduced gap area with the upper surface of the uppermost disk. A ramped border surrounds the dam structure for reducing turbulence generation.

Figure 13:
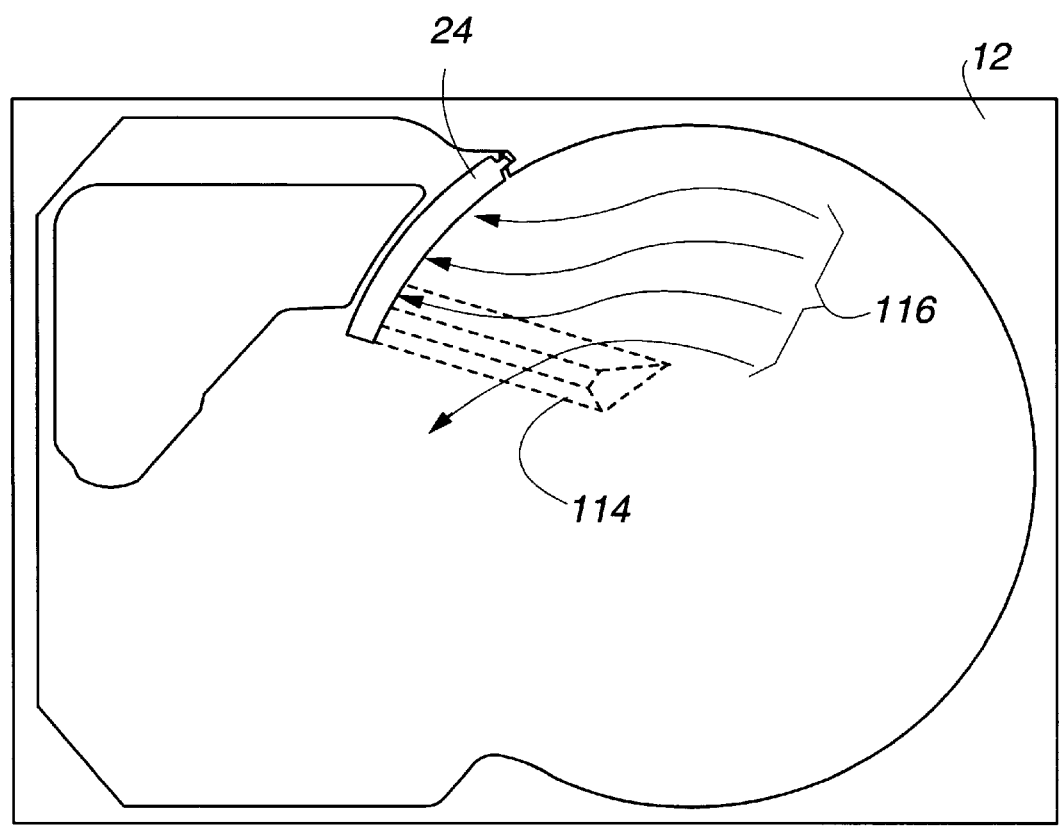
FIG. 13 is a top view of a disk drive baseplate illustrating the location of a dam structure on the underside of a cover plate, as projected onto the baseplate, in one embodiment of the present invention.

FIG. 13 illustrates, using dotted lines projected onto the baseplate floor 110, an outline of a dam region 114 where the cover plate can be dropped toward the top disk for directing airflow into the recirculation filter 24. As illustrated, air currents 116 circulating between the upper disk and the cover plate meet a high pressure ridge as they approach the dam region 114. Thus, instead of flowing forward, the air currents will be channeled outwards toward the low pressure of the recirculation filter 24. The dam structure, therefore, significantly increases the exchange of air within the region between the upper disk and the cover plate.

It should be appreciated that the use of recessed ramp structures and dam structures to channel air flow through the recirculation filter are, to some extent, interchangeable. That is, a dam structure could be used at the baseplate floor and a recessed ramp structure could be used at the cover plate. The main requirement is that the resulting airflow be channeled toward the appropriate filter with little or no turbulence creation.

Although the present invention has been described in conjunction with its preferred embodiments, it is to be understood that modifications and variations may be resorted to without departing from the spirit and scope of the invention as those skilled in the art readily understand. For example, the shape and element location within the disclosed filter embodiments are not intended to limit the invention in any way. Such modifications and variations are considered to be within the purview and scope of the invention and the appended claims.

What is claimed is:

1. A disk drive comprising:

a baseplate forming a base for said disk drive;

at least one disk for storing data within substantially concentric data tracks;

a spin motor, coupled to said baseplate and said at least one disk, for spinning said at least one disk about an axis of rotation, wherein the spinning of said at least one disk generates circulating air currents within said disk drive;

a transducer for sensing data from a surface of said at least one disk as said at least one disk rotates about said axis of rotation;

an actuator arm coupled to said transducer for use in positioning said transducer with respect to said at least one disk;

a motor, coupled to said baseplate and said actuator arm, for imparting controlled motion to said actuator arm to position said transducer adjacent to desire track of said at least one disk in response to a control signal; and a recirculation filter located beside an outer edge of said at least one disk and proximate to said actuator arm for receiving and removing airborne particles from the air currents circulating within said disk drive, wherein said recirculation filter includes a frame having a lower portion which is held within a recessed pocket portion of said baseplate, and a shape of said lower portion of said frame conforms to a shape of said recessed pocket portion.

2. The disk drive, as claimed in claim 1, wherein:

said recirculation filter is located on a side of said actuator arm in a direction opposite that of disk rotation.

3. The disk drive, as claimed in claim 1, wherein:

said recirculation filter is located in a corner of said baseplate immediately preceding, with respect to a direction of disk rotation, a pivot point of said actuator arm.

4. The disk drive, as claimed in claim 1, wherein:

said recirculation filter is stationary.

5. The disk drive, as claimed in claim 1, wherein:

said frame includes an upper portion having an opening, said opening having a filter medium fixed across it so that air currents flowing through said opening also flow through said filter medium.

6. The disk drive, as claimed in claim 5, wherein:

said upper portion of said frame includes an integral locking tab on a side thereof, said locking tab being held within an orifice in a side wall of said baseplate for providing support to said recirculation filter.

7. The disk drive, as claimed in claim 5, wherein:

said upper portion of said frame and said filter medium follow the circular contour of the outer perimeter of said at least one disk.

8. The disk drive, as claimed in claim 1, wherein:

said baseplate includes a recessed portion proximate to an input of said recirculation filter, said recessed portion creating a low pressure zone along said baseplate that channels circulating air into said recirculation filter.

9. The disk drive, as claimed in claim 1, wherein:

said baseplate includes a dam structure in an area near said recirculation filter for creating a zone of high pressure between said baseplate and a lower surface of said at least one disk for channeling air into said recirculation filter, wherein said dam structure includes a raised portion of an upper surface of said baseplate.

10. The disk drive, as claimed in claim 1, further comprising:

a cover plate for covering an internal chamber of said disk drive, said cover plate including a dam structure in an area near said recirculation filter for creating a zone of high pressure between said cover plate and an upper surface of said at least one disk for channeling air outward toward said recirculation filter, wherein said dam structure comprises a dropped portion of a lower surface of said cover plate.

11. The disk drive, as claimed in claim 1, further comprising:

a cover plate for covering an internal chamber of said disk drive, said cover plate including a recessed portion proximate to a location of said recirculation filter, said recessed portion creating a low pressure zone along said cover plate that channels circulating air outward toward said recirculation filter.

12. The disk drive, as claimed in claim 1, wherein:

said recirculation filter is positioned between said at least one disk and said motor so that air flowing through said recirculation filter then flows through said motor.

13. A disk drive comprising:

a baseplate forming a base for said disk drive;

at least one disk for storing data within substantially concentric data tracks;

a spin motor, coupled to said baseplate and said at least one disk, for spinning said at least one disk about an axis of rotation, wherein the spinning of said at least one disk generates circulating air currents within said disk drive;

a transducer for sensing data from a surface of said at least one disk as said at least one disk rotates about said axis of rotation;

an actuator arm coupled to said transducer for use in positioning said transducer with respect to said at least one disk;

a motor, coupled to said baseplate and said actuator arm, for imparting controlled motion to said actuator arm to position said transducer adjacent to a desired track of said at least one disk in response to a control signal; and a recirculation filter located between said at least one disk and said motor for receiving and removing airborne particles from air currents generated by said at least one disk, wherein said air currents flow through said recirculation filter and then about said motor, said recirculation filter includes a frame having a lower portion which is held within a recessed pocket portion of said baseplate, and a shape of said lower portion of said frame conforms to a shape of said recessed pocket portion.

14. The disk drive, as claimed in claim 13, wherein:

said recirculation filter is stationary.

15. A disk drive comprising:

a baseplate forming a base for said disk drive;

at least one disk for storing data within substantially concentric data tracks;

a spin motor, coupled to said baseplate and said at least one disk, for spinning said at least one disk about an axis of rotation, wherein the spinning of said at least one disk generates circulating air currents within said disk drive;

a transducer for sensing data from a surface of said at least one disk as said at least one disk rotates about said axis of rotation;

an actuator arm coupled to said transducer for use in positioning said transducer with respect to said at least one disk;

a motor, coupled to said baseplate and said actuator arm, for imparting controlled motion to said actuator arm to position said transducer adjacent to a desired track of said at least one disk in response to a control signal; and a recirculation filter located beside an outer edge of said at least one disk for receiving and removing airborne particles from the air currents generated by said at least one disk;

wherein said baseplate includes means for channeling air currents circulating between said at least one disk and a floor of said baseplate outward toward said recirculation filter, and said means for channeling includes a recessed portion of said baseplate floor.

16. The disk drive, as claimed in claim 15, wherein:

said recirculation filter is stationary.

17. The disk drive, as claimed in claim 15, wherein:

said means for channeling includes a raised dam structure coupled to said baseplate floor.

18. The disk drive, as claimed in claim 15, further comprising:

a cover plate for covering the disk drive, said cover plate including second means for channeling air currents circulating between said at least one disk and a lower surface of said cover plate outward toward said recirculation filter.

19. The disk drive, as claimed in claim 18, wherein:

said second means for channeling includes a recessed portion of said lower surface of said cover plate.

20. The disk drive, as claimed in claim 18, wherein:

said second means for channeling includes a dam structure coupled to said lower surface of said cover plate.

21. A disk drive comprising:

a baseplate forming a base for said disk drive;

at least one disk for storing data within substantially concentric data tracks;

a spin motor, coupled to said baseplate and said at least one disk, for spinning said at least one disk about an axis of rotation, wherein the spinning of said at least one disk generates circulating air currents within said disk drive;

a transducer for sensing data from a surface of said at least one disk as said at least one disk rotates about said axis of rotation;

an actuator arm coupled to said transducer for use in positioning said transducer with respect to said at least one disk;

a motor, coupled to said baseplate and said actuator arm, for imparting controlled motion to said actuator arm to position said transducer adjacent to a desired track of said at least one disk in response to a control signal; and a recirculation filter located beside an outer edge of said at least one disk and proximate to said actuator arm for receiving and removing airborne particles from the air currents circulating within said disk drive;

wherein said said baseplate includes a recessed portion proximate to an input of said recirculation filter, said recessed portion creating a low pressure zone along said baseplate that channels circulating air into said recirculation filter.

22. A disk drive comprising:

a baseplate forming a base for said disk drive;

at least one disk for storing data within substantially concentric data tracks;

a spin motor, coupled to said baseplate and said at least one disk, for spinning said at least one disk about an axis of rotation, wherein the spinning of said at least one disk generates circulating air currents within said disk drive;

a transducer for sensing data from a surface of said at least one disk as said at least one disk rotates about said axis of rotation;

an actuator arm coupled to said transducer for use in positioning said transducer with respect to said at least one disk;

a motor, coupled to said baseplate and said actuator arm, for imparting controlled motion to said actuator arm to position said transducer adjacent to a desired track of said at least one disk in response to a control signal;

a recirculation filter located beside an outer edge of said at least one disk and proximate to said actuator arm for receiving and removing airborne particles from the air currents circulating within said disk drive; and a cover plate for covering an internal chamber of said disk drive, said cover plate including a recessed portion proximate to a location of said recirculation filter, said recessed portion creating a low pressure zone along said cover plate that channels circulating air outward toward said recirculation filter.

23. A disk drive comprising:

a baseplate forming a base for said disk drive;

at least one disk for storing data within substantially concentric data tracks;

a spin motor, coupled to said baseplate and said at least one disk, for spinning said at least one disk about an axis of rotation, wherein the spinning of said at least one disk generates circulating air currents within said disk drive;

a transducer for sensing data from a surface of said at least one disk as said at least one disk rotates about said axis of rotation;

an actuator arm coupled to said transducer for use in positioning said transducer with respect to said at least one disk;

a motor, coupled to said baseplate and said actuator arm, for imparting controlled motion to said actuator arm to position said transducer adjacent to a desired track of said at least one disk in response to a control signal;

a recirculation filter located beside an outer edge of said at least one disk for receiving and removing airborne particles from the air currents generated by said at least one disk; and a cover plate for covering the disk drive, said cover plate including second means for channeling air currents circulating between said at least one disk and a lower surface of said cover plate outward toward said recirculation filter, wherein said second means for channeling includes a recessed portion of said lower surface of said cover plate.

\* \* \* \* \*